(12) United States Patent
Onodera et al.

(10) Patent No.: US 9,754,697 B2
(45) Date of Patent: Sep. 5, 2017

(54) CONDUCTIVE POLYMER COMPOSITION

(71) Applicant: Idemitsu Kosan Co., Ltd., Chiyoda-ku, Tokyo (JP)

(72) Inventors: Shingo Onodera, Sodegaura (JP); Go Nishimura, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 14/759,142

(22) PCT Filed: Dec. 26, 2013

(86) PCT No.: PCT/JP2013/007635
§ 371 (c)(1),
(2) Date: Jul. 2, 2015

(87) PCT Pub. No.: WO2014/106884
PCT Pub. Date: Jul. 10, 2014

(65) Prior Publication Data
US 2015/0340119 A1    Nov. 26, 2015

(30) Foreign Application Priority Data
Jan. 7, 2013    (JP) .............................. 2013-000572

(51) Int. Cl.
| H01B 1/12 | (2006.01) |
| B32B 27/18 | (2006.01) |
| C08K 5/42 | (2006.01) |
| C08L 101/12 | (2006.01) |
| C09D 179/02 | (2006.01) |
| C08G 73/02 | (2006.01) |
| C08L 79/02 | (2006.01) |
| B32B 27/08 | (2006.01) |

(52) U.S. Cl.
CPC ............ *H01B 1/128* (2013.01); *B32B 27/08* (2013.01); *B32B 27/18* (2013.01); *C08G 73/0266* (2013.01); *C08K 5/42* (2013.01); *C08L 79/02* (2013.01); *C08L 101/12* (2013.01); *C09D 179/02* (2013.01); *H01B 1/12* (2013.01); *H01B 1/124* (2013.01); *B32B 2307/302* (2013.01); *B32B 2307/412* (2013.01); *B32B 2307/54* (2013.01); *B32B 2457/00* (2013.01)

(58) Field of Classification Search
CPC ........... H01B 1/12; H01B 1/124; H01B 1/128
USPC ........................................................ 252/500
See application file for complete search history.

(56) References Cited

U.S. PATENT DOCUMENTS

| 6,478,987 | B1 | 11/2002 | Akita et al. | |
| 7,317,048 | B2 | 1/2008 | Zhang | |
| 7,771,621 | B2* | 8/2010 | Kuramoto | C08G 73/0266 252/500 |
| 8,535,812 | B2 | 9/2013 | Totsuka et al. | |
| 2002/0185631 | A1 | 12/2002 | Akita et al. | |
| 2003/0001143 | A1 | 1/2003 | Akita et al. | |
| 2004/0102577 | A1 | 5/2004 | Hsu et al. | |
| 2004/0192830 | A1 | 9/2004 | Zhang | |
| 2004/0254297 | A1 | 12/2004 | Hsu et al. | |
| 2006/0261314 | A1* | 11/2006 | Lang | C08G 61/124 252/500 |
| 2007/0004899 | A1 | 1/2007 | Hsu et al. | |
| 2007/0108420 | A1 | 5/2007 | Kuramoto | |
| 2008/0248314 | A1 | 10/2008 | Hsu et al. | |
| 2008/0296536 | A1 | 12/2008 | Hsu et al. | |
| 2012/0225310 | A1 | 9/2012 | Totsuka et al. | |
| 2013/0193381 | A1 | 8/2013 | Hsu et al. | |

FOREIGN PATENT DOCUMENTS

| JP | 2001-160407 A | 6/2001 |
| JP | 2006-520994 A | 9/2006 |
| JP | 2006-527277 A | 11/2006 |
| JP | 2012-158620 A | 8/2012 |
| JP | 2012-180395 A | 9/2012 |
| WO | WO-03/080708 A1 | 10/2003 |
| WO | WO-2005/052058 A | 6/2005 |
| WO | WO-2011/027578 A1 | 3/2011 |

OTHER PUBLICATIONS

International Preliminary Report on Patentability and Written Opinion of the International Searching Authority corresponding to Application No. PCT/JP2013/007635, dated Jul. 7, 2015.
International Search Report corresponding to Application No. PCT/JP2013/007635, dated Feb. 18, 2014.
The Extended European Search Report issued in Application No. 13870317.8 dated Aug. 4, 2016.

* cited by examiner

*Primary Examiner* — Haidung Nguyen
(74) *Attorney, Agent, or Firm* — Foley & Lardner LLP

(57) ABSTRACT

A conductive polymer composition including: a conductive polymer; and at least two solvents selected from solvents represented by the following formula (1) (excluding that both of the two solvents are a solvent represented by the formula (1) in which $R_1$ is a straight-chain alkyl group and $R_2$ is a straight-chain alkylene group): $R_1$—O—$R_2$—OH (1) wherein $R_1$ is a straight-chain alkyl group or a branched alkyl group, and $R_2$ is a straight-chain alkylene group or a branched alkylene group.

10 Claims, No Drawings

CONDUCTIVE POLYMER COMPOSITION

TECHNICAL FIELD

The invention relates to a conductive polymer composition.

BACKGROUND ART

A conductive polymer is used in an electrode or the like of a back-up battery of an electrolytic capacitor or an electronic appliance or a lithium ion battery used in a mobile phone or a lap-top PC.

In addition to its electric characteristics, polyaniline, that is one of conductive polymers, has merits and characteristics that it can be synthesized relatively easily from inexpensive aniline and exhibits excellent stability for oxygen or the like in the conductive state. By a method disclosed in Patent Document 1, for example, a polyaniline solution can be obtained easily. Due to its solution state, polyaniline can be used in many applications.

According to applications, a polar solvent is required, not a non-polar solvent. In the case of polyaniline, it is possible to obtain not only a solution of a non-polar solvent but also a solution of a polar solvent (see Patent Document 2, for example).

RELATED ART DOCUMENTS

Patent Documents

Patent Document 1: WO2005/052058
Patent Document 2: WO2011/027578

SUMMARY OF THE INVENTION

As a polyaniline solution using a polar solvent, one obtained by using isopropyl alcohol (IPA) as the solvent can be given. As for this solution, if a solution having a conventional composition is allowed to stand in a state opened to atmosphere, the viscosity of the solution is increased, and the weight is decreased. As a result, a problem arises that workability and yield are decreased (i.e. the pot life is poor).

An object of the invention is to provide a conductive polymer composition that is capable of suppressing an increase in viscosity of a solution and suffering from only a slight decrease in weight.

According to the invention, the following conductive polymer composition is provided.

1. A conductive polymer composition comprising:
    a conductive polymer; and
    at least two solvents selected from solvents represented by the following formula (1) (excluding that both of the two solvents are a solvent represented by the formula (1) in which $R_1$ is a straight-chain alkyl group and $R_2$ is a straight-chain alkylene group):

$$R_1\text{—O—}R_2\text{—OH} \quad (1)$$

wherein $R_1$ is a straight-chain alkyl group or a branched alkyl group, and $R_2$ is a straight-chain alkylene group or a branched alkylene group.
2. The conductive polymer composition according to 1, wherein the conductive polymer is a composite of substituted or unsubstituted polyaniline.
3. The conductive polymer composition according to 2, wherein the polyaniline composite is a composite of unsubstituted polyaniline and a sulfosuccinic derivative represented by the following formula (III):

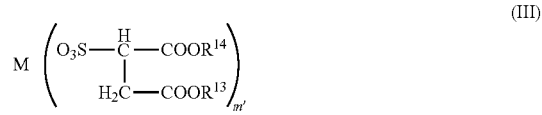

wherein M is a hydrogen atom, an organic free radical group or an inorganic free radical group; m' is the valence of M; $R^{13}$ and $R^{14}$ are independently a hydrocarbon group or a $-(R^{15}O)_r-R^{16}$ group wherein $R^{15}$ is independently a hydrocarbon group or a silylene group, $R^{16}$ is a hydrogen atom, a hydrocarbon group or a $R^{17}_3Si-$ group wherein $R^{17}$ is independently a hydrocarbon group, and r is an integer of 1 or more.
4. The conductive polymer composition according to 3, wherein $R^{13}$ and $R^{14}$ are independently a chain saturated aliphatic hydrocarbon group.
5. The conductive polymer composition according to 3, wherein $R^{13}$ and $R^{14}$ are independently a straight-chain or branched alkyl group including 4 to 24 carbon atoms.
6. The conductive polymer composition according to 3, wherein $R^{13}$ and $R^{14}$ are a 2-ethylhexyl group.
7. The conductive polymer composition according to any one of 1 to 6, which further comprises a compound having a phenolic hydroxyl group.
8. The conductive polymer composition according to 7, wherein the compound having a phenolic hydroxyl group is represented by the following formula (C):

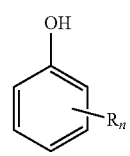

wherein n is an integer of 1 to 5; and R is independently an alkyl group including 1 to 20 carbon atoms, an alkenyl group including 1 to 20 carbon atoms, an alkylthio group including 1 to 20 carbon atoms, a cycloalkyl group including 3 to 10 carbon atoms, an aryl group including 6 to 20 carbon atoms, an alkylaryl group including 7 to 20 carbon atoms or an arylalkyl group including 7 to 20 carbon atoms.
9. The conductive polymer composition according to 8, wherein n is 1 and R is an alkyl group including 1 to 8 carbon atom(s).
10. The conductive polymer composition according to 7, wherein the compound having a phenolic hydroxyl group is p-tert-amylphenol.
11. The conductive polymer composition according to any one of 1 to 10, wherein $R_1$ and $R_2$ independently include 8 or less carbon atom(s).
12. The conductive polymer composition according to any one of 1 to 11 which comprises a solvent in which $R_1$ is a tert-butyl group.
13. The conductive polymer composition according to any one of 1 to 12, wherein neither of the two solvents is a solvent represented by the formula (1) in which $R_1$ is a branched alkyl group and $R_2$ is a branched alkylene group.
14. The conductive polymer composition according to any one of 1 to 13, wherein the two solvents are 3-methoxy-1-butanol and ethylene glycol mono-tert-butyl ether.

15. A formed body obtained by using the conductive polymer composition according to any one of 1 to 14.
16. A conductive stacked body comprising:
a substrate; and
a conductive layer obtained by using the conductive polymer composition according to any one of 1 to 14.
17. A conductive article obtained by forming the conductive stacked body according to 16.

According to the invention, by using in combination two or more types of specific solvents as a solvent, it is possible to provide a conductive polymer composition of which a change in viscosity and a change in weight with the passage of time are suppressed.

MODE FOR CARRYING OUT THE INVENTION

The conductive polymer composition of the invention comprises a conductive polymer and at least two solvents selected from solvents represented by the following formula (1):

wherein in the formula, $R_1$ is a straight-chain alkyl group or a branched alkyl group and $R_2$ is a straight-chain alkylene group or a branched alkylene group.

The composition of the invention comprises at least two selected from compounds represented by the above formula (1). The solvent can be classified into the following four groups according to combination of $R_1$ and $R_2$.

Group A: $R_1$ is a straight-chain alkyl group, $R_2$ is a straight-chain alkylene group (straight-chain alkylene residue)

Group B: $R_1$ is a branched alkyl group, $R_2$ is a straight-chain alkylene group Group C: $R_1$ is a straight-chain alkyl group, $R_2$ is a branched alkylene group Group D: $R_1$ is a branched alkyl group, $R_2$ is a branched alkylene group As for the two types of solvent, if $R_1$ is a straight-chain alkyl group and $R_2$ is a straight-chain alkylene group in the formula (1), i.e. the two types of solvent both belong to the group A, the composition is outside the scope of the invention. In other combinations, i.e. the two solvents are selected from the same group other than the group A or one solvent is selected from one group and another solvent is selected from the other groups, the composition falls within the scope of the invention.

By using these solvents, solubility that is almost equivalent to that of a composition using IPA can be maintained, and evaporation of the solvent can be suppressed.

In the formula (1), as the straight-chain alkyl group represented by $R_1$, the carbon number thereof is preferably 1 to 24, further preferably 1 to 8, and particularly preferably 1 to 4. If the number of carbon atoms is small, hydrophilicity and lipophilicity of the entire molecule are well-balanced, whereby the solubility of a polyaniline composite is improved.

Specific examples include a methyl group, an ethyl group, a n-propyl group, a n-butyl group, a n-pentyl group, a hexyl group, a heptyl group and an octyl group.

As the branched alkyl group represented by $R_1$, the number of carbon atoms is preferably 3 to 24, further preferably 3 to 12, and particularly preferably 3 to 8.

As specific examples thereof, an isopropyl group, an isobutyl group, a sec-butyl group, a tertiary butyl group (t-butyl group), an isopentyl group, a neopentyl group, a tertiary pentyl group, an isohexyl group or the like can be given. Among them, a t-butyl group is preferable.

As the straight-chain alkylene group represented by $R_2$, the number of carbon atoms is preferably 1 to 24, further preferably 1 to 8, and particularly preferably 1 to 4. Specific examples thereof include a methylene group, an ethylene group, a propylene group and a n-butylene group.

If $R_2$ is straight-chain, a hydroxyl group and an alkoxy group may be bonded to any position. For example, if $R_2$ is a n-butylene group, a hydroxyl group and an alkoxy group may be bonded to any of the four carbons.

The branched alkylene group represented by $R_2$ is a group that has 4 or more carbon atoms and has a structure in which at least one hydrogen of a carbon other than the terminal carbon of the above-mentioned straight-chain alkylene group [—$(CH_2)_n$—: n is an integer of 3 or more] is substituted by the straight-chain or branched alkyl group. The number of carbon atoms of the branched alkylene group represented by $R_2$ is preferably 4 to 24, further preferably 4 to 12, and particularly preferably 4 to 8.

As the specific examples, as examples of the group A, 3-methoxy-1-butanol, 1-methoxy-2-propanol, 1-ethoxy-2-propanol, 1-butoxy-2-propanol, 2-methoxy ethanol, 2-ethoxy ethanol, 3-methoxy-1-propanol, ethylene glycol monopropyl ether, ethylene glycol monobutyl ether or the like can be given.

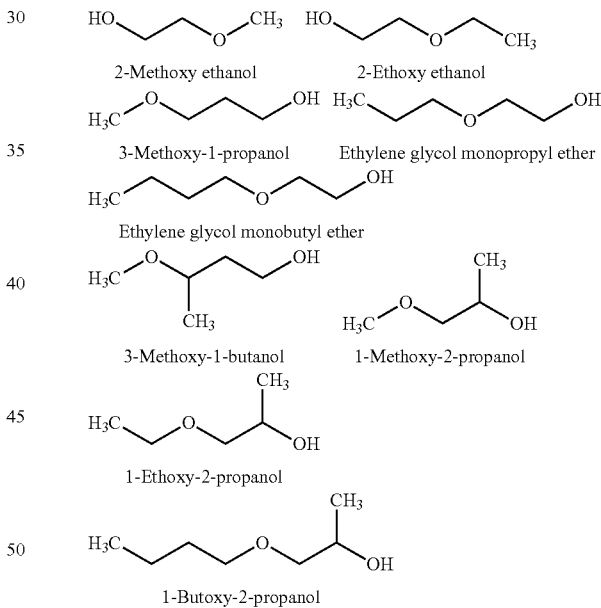

As examples of the group B, ethylene glycol mono-tert-butyl ether, ethylene glycol monoisopropyl ether, ethylene glycol monoisobutyl ether, 1-(1-methylethoxyl)ethanol, 3-(1-methylethoxyl)butane-1-ol, 3-(2,2-dimethylpropoxyl)butane-1-ol, 1-(2,2-dimethylpropoxyl)propanol, 2-isopropoxypropane-2-ol or the like can be given.

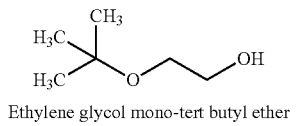

Ethylene glycol mono-tert butyl ether

-continued

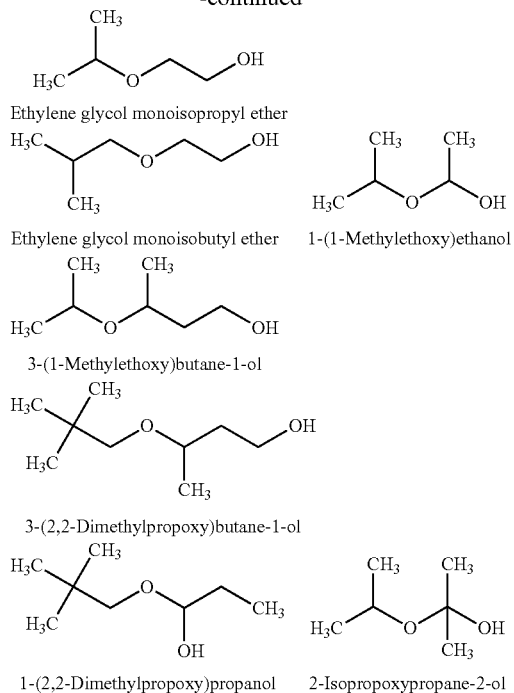

Ethylene glycol monoisopropyl ether

Ethylene glycol monoisobutyl ether 1-(1-Methylethoxy)ethanol 3-(1-Methylethoxy)butane-1-ol 3-(2,2-Dimethylpropoxy)butane-1-ol 1-(2,2-Dimethylpropoxy)propanol 2-Isopropoxypropane-2-ol As examples of the group C, 3-methoxy-3-methyl butanol or the like can be given.

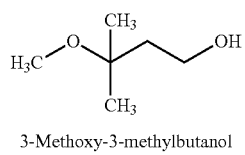

3-Methoxy-3-methylbutanol

As examples of the group D, 2-(2,2-dimethylpropoxy)-2-methylpropane-1-ol or the like can be given.

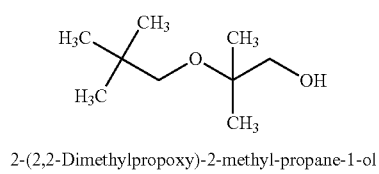

2-(2,2-Dimethylpropoxy)-2-methyl-propane-1-ol

In the invention, it is preferred that neither of the two solvents used be a solvent in which $R_1$ is a branched alkyl group and $R_2$ is a branched alkylene group in the formula (1). That is, as for the solvent, it is preferred that two or more be selected from the above-mentioned groups A, B and C.

It is particularly preferred that one or more be selected from each of the group A and the group B or that one or more be selected from each of the group A and the group C.

The mixing ratio of these two solvents is preferably 1:99 to 99:1 in terms of mass ratio, further preferably 20:80 to 80:20, with 30:60 to 60:30 being particularly preferable.

As the conductive polymer (polymer), a π-conjugated polymer composite in which a π-conjugated polymer is doped with a dopant is preferable. Specifically, a polyaniline composite in which a substituted or unsubstituted polyaniline is doped with a dopant, a polypyrrole composite in which a substituted or unsubstituted polypyrrole is doped with a dopant and a polythiophene composite in which a substituted or unsubstituted polythiophene is doped with a dopant can be given. Among these, a polyaniline composite in which a substituted or unsubstituted polyaniline is doped with a dopant is preferable.

A polyaniline composite is one obtained by doping molecules of a substituted or unsubstituted polyaniline with a dopant.

The weight-average molecular weight of polyaniline molecules (hereinafter referred to as "molecular weight") is preferably 20,000 or more. If the molecular weight is less than 20,000, the strength or stretchability of a conductive article obtained from a polyaniline-containing liquid may be lowered. The molecular weight is preferably 20,000 to 500,000, more preferably 20,000 to 300,000, and further preferably 20,000 to 200,000. The molecular weight is 50,000 to 200,000, 53,000 to 200,000, for example. The above-mentioned weight-average molecular weight is the molecular weight of polyaniline molecules, not the molecular weight of the polyaniline composite.

The molecular weight distribution of polyaniline molecules is preferably 1.5 or more and 20.0 or less, more preferably 1.5 or more and 5.0 or less, further preferably 1.5 or more and 4.5 or less, particularly preferably 1.5 or more and 4.0 or less, and most preferably 1.5 or more and 3.6 or less. The above-mentioned molecular weight distribution is the molecular weight distribution of polyaniline molecules, not the molecular weight distribution of the polyaniline composite.

The molecular weight distribution is a value expressed by weight-average molecular weight/number-average molecular weight. In respect of conductivity, a smaller molecular weight distribution is preferable. The weight-average molecular weight and the molecular weight distribution are obtained as a polystyrene-converted value that is measured by gel permeation chromatography (GPC).

As the substituent of the substituted polyaniline, a straight-chain or branched hydrocarbon group such as a methyl group, an ethyl group, a hexy group and an octyl group; an alkoxy group such as a methoxy group and an ethoxy group; an aryloxy group such as a phenoxy group; and a halogenated hydrocarbon such as a trifluoromethyl group (—$CF_3$ group) can be given.

In respect of versatility and economy, polyaniline molecules are preferably unsubstituted polyaniline molecules.

As the dopant for the polyaniline composite, a Bronsted acid or a Bronsted acid ion formed from a salt of Bronsted acid can be given, and is preferably an organic acid or an organic acid ion formed from a salt of an organic acid. The dopant for a polyaniline composite is further preferably an organic acid ion formed from a compound (proton donar) represented by the following formula (I).

In the present specification, there is a description that the dopant is a specific acid or the dopant is a specific salt. In both cases, the description means that the above-mentioned polyaniline molecules are doped with a specific acid ion formed from a specific acid or a specific acid.

$$M(XAR n)m \quad (I)$$

M in the formula (I) is a hydrogen atom, an organic free radical group or an inorganic free radical group.

As the organic free radical group, a pyridium group, an imidazolium group and an anilinium group can be given, for example. As the inorganic free radical group, lithium, sodium, potassium, cesium, ammonium, calcium, magnesium and iron can be given, for example.

X in the formula (I) is an anion group. For example, a —$SO_3^-$ group, a —$PO_3^{2-}$ group, a —$PO_4(OH)^-$ group, —$OPO_3^{2-}$ group, a —$OPO_2(OH)^-$ group, and a —$COO^-$ group can be given X is preferably a —$SO_3^-$ group.

A in the formula (I) is a substituted or unsubstituted hydrocarbon group.

The above-mentioned hydrocarbon group is a chain or cyclic saturated aliphatic hydrocarbon group, a chain or cyclic unsaturated aliphatic hydrocarbon group or an aromatic hydrocarbon group.

As the chain saturated aliphatic hydrocarbon group, a straight-chain or branched saturated aliphatic hydrocarbon group can be given. The number of carbon is 1 or more and 24 or less, and 2 or more and 8 or less, for example.

As the cyclic saturated aliphatic hydrocarbon group, a cycloalkyl group such as a cyclopentyl group, a cyclohexyl group, a cycloheptyl group and a cyclooctyl group can be given. The cyclic saturated aliphatic hydrocarbon group may be one that is obtained by fusion of plural cyclic saturated aliphatic hydrocarbon groups. For example, a norbornyl group, an adamantyl group and a fused adamantyl group can be given.

As the aromatic hydrocarbon group, a phenyl group, a naphthyl group and an anthracenyl group can be given. As the chain unsaturated hydrocarbon group, a straight-chain or branched alkenyl group can be given.

When A is a substituted hydrocarbon group, the substituent is an alkyl group, a cycloalkyl group, a vinyl group, an allyl group, an aryl group, an alkoxy group, a halogen group, a hydroxyl group, an amino group, an imino group, a nitro group, a silyl group or an ester group.

R in the formula (I) is bonded to A, and is independently —H, or a substituent represented by —$R^1$, —$OR^1$, —$COR^1$, —$COOR^1$, —(C=O)—($COR^1$) or —(C=O)—($COOR^1$). $R^1$ is a hydrocarbon group that may contain a substituent, a silyl group, an alkylsilyl group, a —$(R^2O)x$-$R^3$ group or a —$(OSiR^3_2)x$-$OR^3$ ($R^2$ is independently an alkylene group, $R^3$ is independently a hydrocarbon group and x is an integer of 1 or more).

As the hydrocarbon group of $R^1$, a chain or cyclic saturated aliphatic hydrocarbon group, a chain or cyclic unsaturated aliphatic hydrocarbon group or an aromatic hydrocarbon group can be given, for example. Specific examples thereof include a methyl group, an ethyl group, a straight-chain or branched butyl group, a pentyl group, a hexyl group, a heptyl group, an octyl group, a nonyl group, a decyl group, a dodecyl group, a pentadecyl group and an eicosenyl group. Further, the substituent of the above-mentioned hydrocarbon group is an alkyl group, a cycloalkyl group, a vinyl group, an allyl group, an aryl group, an alkoxy group, a halogen group, a hydroxyl group, an amino group, an imino group, a nitro group or an ester group. The hydrocarbon group of $R^3$ is the same as that of $R^1$.

As the alkylene group of $R^2$, a methylene group, an ethylene group, a propylene group or the like can be given, for example.

n in the formula (I) is an integer of 1 or more, and m in the formula (I) is the valence of M/the valence of X.

As the compound represented by the formula (I), a dialkylbenzenesulfonic acid, a dialkylnaphthalenesulfonic acid or a compound having two or more ester bonds is preferable.

As the compound having two or more ester bonds, a sulfophthalic acid ester or a compound represented by the following formula (II) is more preferable.

$$M\left(\begin{array}{c} R^4 \\ | \\ X-C-COOR^8 \\ | \\ R^5-C-COOR^7 \\ | \\ R^6 \end{array}\right)_m \quad (II)$$

wherein M and X are as defined in the formula (I); and X is preferably a —$SO_3^-$ group.

$R^4$, $R^5$ and $R^6$ in the formula (II) are independently a hydrogen atom, a hydrocarbon group or a $R^9_3Si$— group (wherein $R^9$ is a hydrocarbon group and the three $R^9$s may be the same or different).

As the hydrocarbon group when $R^4$, $R^5$ and $R^6$ are a hydrocarbon group, a straight-chain or branched alkyl group including 1 to 24 carbon atoms, an aryl group having an aromatic ring, an alkylaryl group or the like can be given.

The hydrocarbon group of $R^9$ is the same as that of $R^4$, $R^5$ and $R^6$.

$R^7$ and $R^8$ in the formula (II) are independently a hydrocarbon group or a —$(R^{10}O)_q$—$R^{11}$ group [wherein $R^{19}$ is a hydrocarbon group or a silylene group, $R^{11}$ is a hydrogen atom, a hydrocarbon group or $R^{12}_3Si$— (wherein $R^{12}$ is a hydrocarbon group and the three $R^{12}$s may be the same or different), and q is an integer of 1 or more].

As the hydrocarbon group when $R^7$ and $R^8$ are a hydrocarbon group, a chain or cyclic saturated aliphatic hydrocarbon group, a chain or cyclic unsaturated aliphatic hydrocarbon group or an aromatic hydrocarbon group or the like can be given. For example, a straight-chain or branched alkyl group including 1 to 24 (preferably 4 or more and 24 or less) carbon atoms, an aryl group having an aromatic ring and an alkylaryl group can be given. As specific examples of the hydrocarbon group when $R^7$ and $R^8$ are a hydrocarbon group, a straight-chain or branched butyl group, a straight-chain or branched pentyl group, a straight-chain or branched hexyl group, a straight-chain or branched octyl group and a straight-chain or branched decyl group can be given, for example. The hydrocarbon group is preferably a straight-chain or branched octyl group, with a 2-ethylhexyl group being further preferable.

In $R^7$ and $R^8$, as the hydrocarbon group when $R^{10}$ is a hydrocarbon group, a straight-chain or branched alkylene group including 1 to 24 carbon atoms, an arylene group containing an aromatic ring, an alkylarylene group and an arylalkylene group can be given, for example. In $R^7$ and $R^8$, as the hydrocarbon group when $R^{11}$ and $R^{12}$ are hydrocarbon groups, the same hydrocarbon group as in the case of $R^4$, $R^5$ and $R^6$ can be given. q is preferably 1 to 10.

Specific examples of the compound represented by the formula (II) when $R^7$ and $R^8$ are a —$(R^{10}O)_q$—$R^{11}$ group (excluding M and m) include two compounds represented by the following formulas:

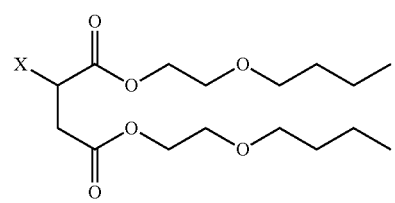

-continued

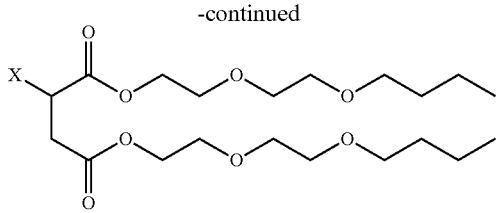

wherein X is as defined in the formula (I).

It is further preferred that the compound represented by the following formula (II) be a sulfosuccinic acid derivative represented by the following formula (III).

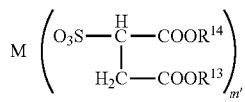
(III)

wherein M is as defined in the formula (I), and m' is the valance of M.

$R^{13}$ and $R^{14}$ in the formula (III) are independently a hydrocarbon group or a $—(R^{15}O)_1—R^{16}$ group [wherein $R^{15}$ is independently a hydrocarbon group or a silylene and $R^{16}$ is a hydrogen atom, a hydrocarbon group or a $R^{17}{}_3Si—$ group (wherein $R^{17}$ is independently a hydrocarbon group)] and r is an integer of 1 or more).

The hydrocarbon group when $R^{13}$ and $R^{14}$ are a hydrocarbon group is the same as that for $R^7$ and $R^8$. For example, the hydrocarbon group is a chain saturated aliphatic hydrocarbon group and a straight-chain or branched alkyl group including 4 to 24 carbon atoms. As specific examples thereof, a straight-chain or branched butyl group, a straight-chain or branched pentyl group, a straight-chain or branched hexyl group, a straight-chain or branched octyl group and a straight-chain or branched decyl group can be given. A straight-chain or branched octyl group is preferable, with a 2-ethylhexyl group being further preferable.

In $R^{13}$ and $R^{14}$, as the hydrocarbon group when $R^{15}$ is a hydrocarbon group, the same hydrocarbon group as that for $R^{10}$ mentioned above can be given. In $R^{13}$ and $R^{14}$, as the hydrocarbon group when $R^{16}$ and $R^{17}$ are a hydrocarbon group, the same hydrocarbon group as that for $R^4$, $R^5$ and $R^6$ can be given.

r is preferably 1 to 10.

As specific examples of the compound when $R^{13}$ and $R^{14}$ are a $—(R^{15}O)_r—R^{16}$ group, the same compounds as those when $R^7$ and $R^8$ are a $—(R^{10}O)_q—R^{11}$ group can be given.

The hydrocarbon group of $R^{13}$ and $R^{14}$ is the same as that for $R^7$ and $R^8$, and a butyl group, a hexyl group, a 2-ethylhexyl group and a decyl group are preferable.

It is known that the dopant mentioned above can control the conductivity or solubility of a polyaniline composite in a solvent (U.S. Pat. No. 3,384,566) by changing the structure thereof. In the invention, according to required properties that differ according to the application, an optimum dopant can be selected.

As the compound represented by the formula (I), di-2-ethylhexylsulfosuccinic acid and sodium di-2-ethylhexylsulfosuccinate are preferable. As the dopant used in the invention, a di-2-ethylhexylsulfosuccinic acid ion is preferable.

Doping of a substituted or unsubstituted polyaniline with a dopant of a polyaniline composite can be confirmed by the UV-Vis-NIR spectroscopy or the X-ray photoelectron spectroscopy. The dopant can be used without particular restrictions in chemical structure as long as it has an acidity sufficient for allowing carriers to be generated in polyaniline.

A polyaniline composite can be produced by a known production method. For example, it can be produced by subjecting substituted or unsubstituted aniline to chemical oxidative polymerization in a solution that contains a proton donor, phosphoric acid and an emulsifier other than a proton donor and has two liquid phases. Alternatively, a polyaniline composite can be produced by adding an oxidation polymerizing agent to a solution that contains a substituted or unsubstituted aniline, a proton donor, phosphoric acid and an emulsifier other than a proton donor and has two liquid phases.

It is thought that an emulsifier serves to prevent phase inversion mentioned later. When a polyaniline composite is produced by subjecting substituted or unsubstituted aniline to chemical oxidative polymerization in a solution that contains a proton donor and phosphoric acid and has two liquid phases, as compared with a case where hydrochloric acid is used instead of phosphoric acid, the amount of a low-molecular weight component is increased. In respect of the state during polymerization when phosphoric acid is used, it is thought that the above-mentioned two liquid phases are inverted during polymerization. This phase inversion is assumed to be a cause for increasing the amount of a low-molecular weight component. The phenomenon of the phase inversion is a phenomenon that a liquid phase as a continuous phase is inverted to a dispersion phase and the other liquid phase that is a dispersion phase is inverted to a continuous phase.

Here, the "solution that has two liquid phases" means a state where two incompatible liquid phases are present in a solution. For example, it means a state where a "high-polarity solvent phase" and a "low-polarity solvent phase" are present in a solution.

In addition, the "solution that has two liquid phases" includes a state where one liquid phase is a continuous phase and the other liquid phase is a dispersion phase. For example, a state where the "high-polarity solvent phase" is a continuous phase and the "low-polarity solvent phase" is a dispersion phase and a state where the "low-polarity solvent phase" is a continuous phase and the "high-polarity solvent phase" is a dispersion phase.

Water is preferable as the high-polarity solvent used in the method for producing a polyan line composite. As the low-polarity solvent, an aromatic hydrocarbon such as toluene and xylene is preferable, for example.

The proton donor mentioned above is preferably a compound represented by the formula (I), more preferably a compound represented by the formula (II), and further preferably a compound represented by the formula (III).

As for the emulsifier, both of an ionic emulsifier (hydrophilic portion is ionic) and a non-ionic emulsifier (hydrophilic portion is non-ionic) can be used. One or two or more of emulsifiers can be used in combination.

As the ionic emulsifier, a cationic emulsifier, an anionic emulsifier and a zwitter-ionic emulsifier can be given.

As specific examples of an anionic emulsifier, fatty acid, disproportionated rosin soap, higher alcohol ester, polyoxyethylene alkyl ether phosphate, alkenyl succinic acid, sarcosinate, salts thereof can be given.

As specific examples of a cationic emulsifier, an alkyl dimethyl benzyl ammonium salt and an alkyl trimethyl ammonium salt can be given.

As specific examples of a zwitter-ionic emulsifier, an alkyl betaine emulsifier, an alkyl amide betaine emulsifier, an amino acid emulsifier and an amine oxide emulsifier can be given.

As specific examples of a non-ionic emulsifier, a polyoxyethylene alkyl ether, a polypropylene glycol polyethylene glycol ether, a polyoxyethylene glycerol borate fatty acid ester and a polyoxyethylene sorbitan fatty acid ester can be given.

Among the above-mentioned emulsifiers, an anionic emulsifier and a non-ionic emulsifier are preferable.

As the anionic emulsifier, an anionic emulsifier having a phosphoric acid ester structure is further preferable. Further, as the non-ionic emulsifier, a non-ionic emulsifier having a polyoxyethylene sorbitan fatty acid ester structure is further preferable.

The amount of a proton donor is preferably 0.1 to 0.5 mol, more preferably 0.3 to 0.45 mol, and further preferably 0.35 to 0.4 mol, per mol of an aniline monomer.

If the amount of the proton donor is larger than this range, the "phase of a high-polarity solvent" and the "phase of a low-polarity solvent" may not be able to be separated after completion of polymerization, for example.

The concentration of phosphoric acid used is 0.3 to 6 mol/L, more preferably 1 to 4 mol/L, and further preferably 1 to 2 mol/L, relative to the amount of a high-polarity solvent.

The amount of an emulsifier is preferably 0.001 to 0.1 mol, more preferably 0.002 to 0.02 mol, and further preferably 0.003 to 0.01 mol, relative to 1 mol of an aniline monomer.

If the amount of the emulsifier is larger than this range, the "phase of a high-polarity solvent" and the "phase of a low-polarity solvent" may not be able to be separated after completion of polymerization.

As the oxidizing agent used for chemical oxidative polymerization reaction (hereinbelow, often referred to as the "oxidative polymerizing agent"), sodium persulfate, potassium persulfate, ammonium persulfate and peroxides such as hydrogen persulfate; ammonium dichromate, ammonium perchlorate, potassium iron (III) sulfate, iron (III) trichloride, manganese dioxide, iodic acid, potassium permanganate, p-toluenesulfonic acid iron or the like can be used. Among these, a persulfate such as ammonium persulfate is preferable.

These oxidizing agents may be used singly or in combination of two or more.

The amount of the oxidizing agent is preferably 0.05 to 1.8 mol, more preferably 0.8 to 1.6 mol, and further preferably 1.2 to 1.4 mol, relative to 1 mol of the aniline monomer. By allowing the amount of the oxidizing agent to be in this range, a sufficient polymerization degree can be obtained. In addition, since aniline is sufficiently polymerized, recovery by liquid separation can be conducted easily, and there is no fear that the solubility of the polymer may be decreased.

The polymerization temperature is normally −5 to 60° C., preferably −5 to 40° C. Further, the polymerization temperature may be changed during the polymerization reaction. By allowing the polymerization temperature to be within this range, occurrence of a side effect can be avoided.

Specifically, a polyaniline composite can be produced by the following method.

A solution obtained by dissolving a proton donor and an emulsifier in toluene is placed in a separable flask that is put in an inert atmosphere such as nitrogen. Further, to this solution, substituted or unsubstituted aniline is added.

Thereafter, phosphoric acid that does not contain chlorine is added to the solution, and the solution temperature is lowered.

After lowering the solution internal temperature, stirring is conducted. A solution obtained by dissolving ammonium persulfate in phosphoric acid is added dropwise by means of a dropping funnel, whereby a reaction is caused to occur. Thereafter, the solution temperature is increased to continue the reaction. After completion of the reaction, the solution is allowed to stand and is separated into two phases. An aqueous phase is separated. Toluene is added to an organic phase, and the organic phase is washed with phosphoric acid and ion exchange water, whereby a toluene solution of a polyaniline composite (protonated polyaniline) can be obtained.

A slight amount of insoluble matters contained in the resulting composite solution was removed, and the toluene solution of a polyaniline composite is recovered. This solution is transferred to an evaporator, and heated and the pressure thereof is reduced. As a result, volatile matters are distilled off by evaporation, thereby to obtain a polyaniline composite.

Polyaniline molecules that are not a polyaniline composite can be produced by a known method. As specific examples, a production method disclosed in JP-A-H03-28229 can be mentioned. In the presence of protonic acid, while keeping the temperature to be 5° C. or less, for example, an aqueous solution of the oxidizing agent is gradually added to aniline in a solvent, in an amount of 2 equivalences or more, for example, per one mole of aniline (the equivalence is defined as an amount obtained by dividing 1 mole of the oxidizing agent by the amount of electrons required to reduce one molecule of the oxidizing agent), whereby an oxidized polymer of aniline doped with the protonic acid was generated. Then, this polymer is de-doped with a basic material, whereby polyaniline molecules are produced.

Further, by mixing the above-mentioned polyaniline composite with a 1M aqueous sodium hydroxide solution to prepare de-doped polyaniline powder, and the polyaniline powder is dissolved in NMP (N-methylpyrrolidone), whereby a solution of polyaniline molecules can be produced.

When the conductive polymer is polypyrrole, the molecular weight, molecular weight distribution and the substituent of substituted polypyrrole are the same as those of the polyaniline mentioned above.

No specific restrictions are imposed on the dopant of the polypyrrole composite. An acceptor dopant that is preferably used in a conductive polymer that normally comprises pyrrole and/or pyrrole derivative can be appropriately used.

As representative examples thereof, a sulfonic acid such as polystyrene sulfonic acid, p-toluenesulfonic acid, methanesulfonic acid, trifluoromethanesulfonic acid, anthraquinone sulfonic acid, benzenesulfonic acid, naphthalenesulfonic acid, sulfosalicylic acid, dodecylbenzenesulfonic acid and allylsulfonic acid; halogens such as perchloric acid, chlorine and bromine; Lewis acid, protonic acid or the like can be given. They may be in the form of an acid or a salt. In respect of solubility in a monomer, tetrabutylammonium perchlorate, tetraethylammonium perchlorate, tetrabutylammonium tetrafluoroborate, tetrabutylammonium trifluoromethanesulfonate, tetrabutylammonium trifluorosulfonimide, dodecylbenzenesulfonic acid, paratoluenesulfonic acid or the like are preferable.

When a dopant is used, the amount thereof is such that it becomes 0.01 to 0.3 molecules per unit of the pyrrole polymer. If the amount of the dopant is 0.01 molecules or less, it is insufficient as the amount of a dopant necessary for forming a sufficient conductive path, and with such an amount, it becomes difficult to obtain high conductivity. On the other hand, if the dopant is added in an amount of 0.3 molecules or more, the doping ratio is not improved. Therefore, addition of a dopant in an amount of 0.3 molecules or more is not economically preferable. Here, the pyrrole polymer unit means a repeating unit part corresponding to one molecule of a monomer of a pyrrole polymer that is obtained by polymerizing pyrrole monomers.

When the conductive polymer is polythiophene, the molecular weight, the molecular weight distribution and the substituent of the substituted polythiophene are the same as those of the polyaniline mentioned above. As the substituted polythiophene, polyoxyethylene dioxythiophene (PEDOT) is preferable.

As the dopant of the polythiophene composite, an organic acid ion and an inorganic acid ion of an anionic surfactant can be given. As the organic acid ion of the anionic surfactant, a sulfonic acid ion, an esterified sulfonic acid ion or the like can be given. As the inorganic acid ion, a sulfuric acid ion, a halogen ion, a nitric acid ion, a perchloric acid ion, a hexacyanoferric acid ion, a phosphoric acid ion, a phosphomolybdic acid ion or the like can be given.

In the conductive polymer composition of the invention, the amount ratio of conductive polymers in the solvent is not particularly restricted, but is normally 900 g/kg or less, preferably 0.01 g/kg or more and 300 g/kg or less, more preferably 10 g/kg or more and 300 g/kg or less, and further preferably 30 g/kg or more and 300 g/kg or less relative to 1 kg of the composition.

If the conductive polymer is a polyaniline composite, a compound that contains a phenolic hydroxyl group (hereinafter often referred to as the "phenolic compound") may be added as the second dopant. This compound is not particularly restricted as long as it is a compound having a phenolic hydroxyl group. A compound containing a phenolic hydroxyl group is a compound that has one phenolic hydroxyl group, a compound containing plural phenolic hydroxyl groups or a polymer compound that is comprised of repeating units that have one or plural phenolic hydroxyl groups.

The compound having one phenolic hydroxyl group is preferably compounds represented by the following formulas (A), (B) and (C):

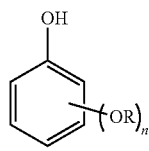

(A)

wherein n is an integer of 1 to 5, preferably 1 to 3, and more preferably 1.

R is an alkyl group including 1 to 20 carbon atoms, an alkenyl group, a cycloalkyl group, an aryl group, an alkylaryl group or an arylalkyl group.

In the phenolic compound represented by the formula (A), it is preferred that —OR be substituted at a meta- or a para-position of the phenolic hydroxyl group. By allowing the substitution position of —OR to be a meta- or a para-position, the steric hindrance of the phenolic hydroxyl group is suppressed, whereby conductivity of the composition can be further improved.

As specific examples of the phenolic compound represented by the formula (A), methoxyphenol (e.g. 4-methoxyphenol), ethoxyphenol, propoxyphenol, isopropoxyphenol, butyloxyphenol, isobutyloxyphenol and tert-butyloxyphenol can be given.

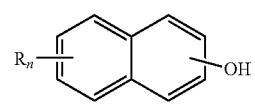

(B)

wherein n is an integer of 0 to 7, preferably 0 to 3, and more preferably 1.

R is independently an alkyl group including 1 to 20 carbon atoms, an alkenyl group, an alkylthio group, a cycloalkyl group including 3 to 10 carbon atoms, an aryl group including 6 to 20 carbon atoms, an alkylaryl group or an arylalkyl group.

As specific examples of the phenolic compound represented by the formula (B), hydroxynaphthalene can be given.

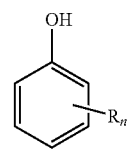

(C)

wherein n is an integer of 1 to 5, preferably 1 to 3, more preferably 1.

R is independently an alkyl group including 1 to 20 carbon atoms, an alkenyl group including 1 to 20 carbon atoms, an alkylthio group including 1 to 20 carbon atoms, a cycloalkyl group including 3 to 10 carbon atoms, an aryl group including 6 to 20 carbon atoms, an alkylaryl group including 7 to 20 carbon atoms or an arylalkyl group including 7 to 20 carbon atoms.

As specific examples of the compound represented by the formula (C), o-, m- or p-cresol, o-, m- or p-ethylphenol, o-, m- or p-propylphenol (e.g. 4-isopropylphenol), o-, m- or p-butylphenol, o-, m- or p-pentylphenol (e.g. 4-tert-pentylphenol) can be given.

As for R in the formulas (A), (B) and (C), as the alkyl group including 1 to 20 carbon atoms, an alkyl group including 1 to 8 carbon atoms is preferable, and methyl, ethyl, propyl, isopropyl, butyl, isobutyl, tert-butyl or the like can be given.

As the alkenyl group, a group in which an unsaturated bond is present within a molecule of the above-mentioned alkyl group can be given.

As the cycloalkyl group, cyclopentane, cyclohexane or the like can be given.

As the aryl group, phenyl, naphthyl or the like can be given.

As the alkylaryl group and the arylalkyl group, a group obtained by combining the alkyl group and the aryl group mentioned above or the like can be given.

Examples of the compound having one phenolic hydroxyl group are given above. As specific examples of the substituted phenol, phenol, o-, m- or p-chlorophenol, salicylic acid and hydroxybenzoic acid can be given. As specific examples of the compound having plural phenolic hydroxyl groups, catechol, resorcinol and a compound represented by the following formula (D) can be given.

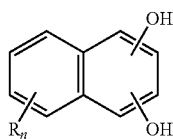

(D)

wherein R is a hydrocarbon group, a hetero atom-containing hydrocarbon group, a halogen atom, carboxylic acid, an amino group, a SH group, a sulfonic acid group or a hydroxyl group; plural Rs may be the same or different from each other; and n is an integer of 0 to 6.

It is preferred that the phenolic compound represented by the formula (D) have two or more hydroxyl groups that are not adjacent to each other.

As specific examples of the phenolic compound represented by the formula (D), 1,6-naphthanediol, 2,6-naphthalenediol and 2,7-naphthalenediol can be given.

As specific examples of the polymer compound that is comprised of repeating units having one or plural phenolic hydroxyl groups, a phenol resin, polyphenol and poly(hydroxystyrene) can be given.

In the conductive polymer composition of the invention, it is preferred that the content of the phenolic compound be from 1 mass % to 40 mass %, more preferably from 10 mass % to 30 mass % of the entire composition. If the content of the phenolic compound is too small, the conductivity of the polyaniline, when it is formed into a thin film, is lowered, whereby solubility is lowered. Further, when the content is 50 mass % or more, the viscosity of the solution may be increased, leading to gelation of the composition.

The composition of the invention may contain a heat-resistant stabilizer. The heat-resistant stabilizer is an acidic substance or a salt of an acidic substance, and the acidic substance may be either an organic acid (an acid of an organic compound) or an inorganic acid (an acid of an inorganic compound).

The composition of the invention may contain plural heat-resistant stabilizers.

When the composition is a composition containing a polyaniline composite and the composition contains only an acidic substance as a heat-resistant stabilizer, the acidic substance is preferably a compound that is different from a proton donor in the polyaniline composite. When the composition contains only a salt of an acidic substance, the salt of an acidic substance is preferably a compound different from a proton donor in the polyaniline composite. Further, when the composition contains both an acidic substance and a salt of an acidic substance as the heat-resistant stabilizer, it is preferred that at least one of the acidic substance and the salt of the acidic substance be a compound different from the proton donor.

If the composition contains only an acidic substance as the heat-resistant stabilizer, the acidic substance is preferably different from a phenolic compound. If the composition contains only a salt of an acidic substance as the heat-resistant stabilizer, the salt of an acidic substance is preferably different from a phenolic compound. Further, if the composition contains both an acidic substance and a salt of an acidic substance as the heat-resistant stabilizer, it is preferred that at least one of the acidic substance and the salt of the acidic substance be different from a phenolic compound.

The acidic substance as the heat-resistant stabilizer is preferably an organic acid, more preferably an organic acid having one or more of a sulfonic acid group, a carboxyl group, a phosphoric acid group or a phosphonic acid group. It is more preferred that the acidic substance be an organic acid having one or more sulfonic acid groups.

The organic acid having one or more sulfonic acid groups is preferably a cyclic, chain or branched alkylsulfonic acid, a substituted or unsubstituted aromatic sulfonic acid or polysulfonic acid, having one or more sulfonic acid group.

As the alkylsulfonic acid, methanesulfonic acid, ethanesulfonic acid and di-2-ethylhexylsulfosuccinic acid can be given. The alkyl group in the alkylsulfonic acid is preferably a straight-chain or branched alkyl group including 1 to 18 carbon atoms.

As the aromatic sulfonic acid, sulfonic acid having a benzene ring, sulfonic acid having a naphthalene skeleton, sulfonic acid having an anthracene skeleton, substituted or unsubstituted benzenesulfonic acid, substituted or unsubstituted naphthalenesulfonic acid and substituted or unsubstituted anthracenesulfonic acid can be given. Among these, naphthalenesulfonic acid is preferable. As specific examples, naphthalenesulfonic acid, dodecylbenzenesulfonic acid and anthraquinonesulfonic acid can be given. They can be used by adding a hydrate thereof to the composition.

Here, the substituent is a substituent selected from the group consisting of an alkyl group, an alkoxy group, a hydroxyl group, a nitro group, a carboxy group and an acyl group, and they may be substituted with one or more substituents.

The polysulfonic acid is a sulfonic acid in which a main chain or a side chain of a high-molecular chain is substituted by plural sulfonic acid groups. For example, polystyrenesulfonic acid can be given.

The organic acid having one or more carboxyl groups is preferably a cyclic, chain or branched alkylcarboxylic acid, a substituted or unsubstituted aromatic carboxylic acid or polycarboxylic acid which has one or more carboxyl groups.

As the alkylcarboxylic acid mentioned above, undecylenic acid, cyclohexane carboxylic acid, and 2-ethyihexanoic acid can be given. The alkyl group is preferably a straight-chain or branched alkyl group including 1 to 18 carbon atoms.

As the substituted or unsubstituted aromatic carboxylic acid, substituted or unsubstituted benzenecarboxylic acid and naphthalene carboxylic acid can be given, for example. The substituent is a substituent selected from a sulfonic acid group, an alkyl group, an alkoxy group, a hydroxy group, a nitro group and an acyl group. The acid may be substituted with one or more substituents. Specific examples thereof include salicylic acid, benzoic acid, naphthoic acid and trimesic acid.

The organic acid having one or more phosphoric acid groups or one or more phosphonic acid groups is preferably a cyclic, chain or branched alkylphosphoric acid or alkylphosphonic acid; substituted or unsubstituted aromatic phosphoric acid or aromatic phosphonic acid; polyphosphoric acid or polyphosphonic acid, having one or more phosphoric acid groups or one or more phosphonic groups.

As the alkylphosphoric acid or the alkylphosphonic acid, dodecyl phosphoric acid and bis(2-ethylhexyl)hydrogen phosphate can be given, for example. Here, the alkyl group is preferably a straight-chain or branched alkyl group including 1 to 18 carbon atoms.

As the aromatic phosphoric acid and the aromatic phosphonic acid, a substituted or unsubstituted benzenesulfonic acid or benzenephosphonic acid and naphthalenesulfonic acid or naphthalenephosphonic acid or the like can be given. The substituent is a substituent selected from the group consisting of an alkyl group, an alkoxy group, a hydroxyl group, a nitro group, a carboxy group and an acyl group. The acid may be substituted by one or more substituents. Phenylphosphonic acid can be given, for example.

As the salt of an acidic substance contained in the conductive polymer composition, a salt of the acidic substance mentioned above can be given.

The conductive polymer composition may comprise two or more of an acidic substance and/or a salt of an acidic substance as the heat-resistant stabilizer. Specifically, it may comprise plural acidic substances different from each other and/or plural salts of acidic substances different from each other.

When the proton donor of the polyaniline composite is sulfonic acid and the composition contains only an acidic substance as the heat-resistant stabilizer, it is preferred that the acidic substance be a sulfonic acid that is the same as or different from the proton donor. Further, if the composition contains only a salt of an acidic substance as the heat-resistant stabilizer, it is preferred that the salt of an acidic substance be a salt of a sulfonic acid that is the same as or different from the proton donor of the polyaniline composite.

When the conductive polymer composition contains an acidic substance and a salt of the acidic substance, it is preferred that at least one of the acidic substance and the salt of the acidic substance be sulfonic acid or a salt of sulfonic acid that is the same as or different from the proton donor.

When the conductive polymer composition contains only sulfonic acid as the heat-resistant stabilizer, it is preferred that the formula (12) be satisfied. When the composition contains only a salt of sulfonic acid as the heat-resistant stabilizer, it is preferred that the formula (13) be satisfied. If the composition contains sulfonic acid and a salt of sulfonic acid as the heat-resistant stabilizer, it is preferred that the formula (14) be satisfied.

$$0.01 \leq S_2/N_2 \leq 0.5 \quad (12)$$

$$0.01 \leq S_3/N_3 \leq 0.5 \quad (13)$$

$$0.01 \leq S_4/N_4 \leq 0.5 \quad (14)$$

wherein $S_2$ is the total of number of moles of sulfur atoms of all of the acidic substances contained in the conductive polymer composition; $N_2$ is the total of number of moles of nitrogen atoms of all of the polyaniline composites contained in the conductive polymer composition; $S_3$ is the total of number of moles of sulfur atoms of all of the salts of the acidic substances contained in the conductive polymer composition; $N_3$ is the total of number of moles of nitrogen atoms of all of the polyaniline composites contained in the conductive polymer composition; $S_4$ is the total of number of moles of sulfur atoms of all of the acidic substances and all of the salts of acidic substances contained in the conductive polymer composition; and $N_4$ is the total of number of moles of nitrogen atoms of all of the polyaniline composites contained in the conductive polymer composition.

When the conductive polymer composition of the invention satisfies any one of the formulas (12), (13) and (14), the composition preferably further satisfies the following formula (11):

$$0.36 \leq S_1/N_1 \leq 1.15 \quad (11)$$

wherein $S_1$ is the number of moles of sulfur atoms contained in the conductive polymer composition and $N_1$ is the number of moles of nitrogen atoms contained in the conductive polymer composition.

When the conductive polymer composition contains only an acidic substance, it is preferred that the acidity (pKa) of the acidic substance be 5.0 or less. No specific restrictions are imposed on the lower limit of the acidity. However, if an acidic substance having an acidity of −4.0 or less is contained, the polyaniline composite may be deteriorated.

If the conductive polymer composition contains only a salt of an acidic substance, it is preferred that the acidity of the salt of an acidic substance be 5.0 or less. As for the lower limit of the acidity, the same as that mentioned above regarding the acidic substance can be applied.

If the conductive polymer composition contains both an acidic substance and a salt of an acidic substance, it is preferred that at least one of the following be satisfied: the acidity of the acidic substance is 5.0 or less and the acidity of the salt of the acidic substance is 5.0 or less. As for the lower limit, the same as that mentioned above can be applied.

The acidity (pKa) can be defined by the computational chemistry. Specifically, the charge density on the molecular surface is calculated by the quantum chemistry developed by A. Klamt et al., and interaction between different molecules is calculated as the activity coefficient (appeared in Journal of Physical Chemistry, 1995, vol. 99, page 2224).

Specifically, by using "TURBOMOLE Version 6.1" (manufactured by COSMO logic Co., Ltd.), the structure is optimized by using TZVP as the basic function. By using this structure, the COSMO-RS calculation is conducted by "COSMO therm Version C2.1 Release 01.10" (manufactured by COSMO logic Co., Ltd.).

By inputting to "COSMO therm Version C2.1 Release 01.10" conditions in a water solvent of 25° C., the chemical formula of the molecules and the chemical formula of de-protonated molecules, pKa can be calculated.

In the conductive polymer composition, the content of the heat-resistant stabilizer is preferably 1 to 1000 parts by mass, more preferably 10 to 100 parts by mass, and further preferably 10 to 40 parts by mass relative to 100 parts by mass of the conductive polymer.

The conductive polymer composition of the invention may further comprise additives such as other resins, inorganic materials, hardening agents, plasticizers and organic conductive materials.

Other resins may be contained as a binder base material, a plasticizer or a matrix base material, for example.

As specific examples of other resins, polyolefins such as polyethylene and polypropylene, chlorinated polyolefin, polystyrene, polyester, polyamide, polyacetal, polyethylene terephthalate, polycarbonate, polyethylene glycol, polyethylene oxide, polyacrylic acid, polyacrylic acid ester, polymethacrylic acid ester and polyvinyl alcohol can be given, for example.

Instead of the above-mentioned resin or together with the resin, a thermo-setting resin such as an epoxy resin, a urethane resin and a phenol resin or a precursor capable of forming these thermosetting resins may be contained.

An inorganic material is added in order to improve mechanical properties such as strength, surface hardness and dimensional stability, or to improve electric properties such as conductivity, for example.

As specific examples of the inorganic material, silica (silicon dioxide), titania (titanium dioxide), alumina (aluminum dioxide), Sn-containing $In_2O_3$ (ITO), Zn-containing In$_2$O$_3$, Co-substituted compounds of In$_2$O$_3$ (oxide in which trivalent In is substituted by a tetravalent element and a divalent element), Sb-containing SnO$_2$ (ATO), ZnO, Al-containing ZnO (AZO), Ga-containing ZnO (GZO) or the like can be given.

A hardening agent is added for the purpose of improving mechanical properties such as strength, surface hardness and dimensional stability, for example. As specific examples of the hardening agent, a heat curing agent such as a phenol resin and a photo-hardening agent formed of an acrylate-based monomer and a photopolymerization initiator can be given.

A plasticizer is added in order to improve mechanical properties such as tensile strength and bending strength.

As specific examples of the plasticizer, phthalic acid esters or phosphoric acid esters can be given. As the organic conductive material, carbon materials such as carbon black and carbon nanotube, or a conductive polymer other than the polyaniline obtained in the invention can be given, for example.

In the conductive polymer composition, 90 wt % or more, 95 wt % or more, 98 wt % or more and 100 wt % thereof may be the conductive polymer mentioned above, a solvent, optionally, a phenolic compound, a heat-resistant stabilizer, an additive such as other resins, inorganic materials, hardening agents, plasticizers and organic conductive materials.

The method for producing the composition of the invention that contains the above-mentioned components is not particularly restricted, and the composition of the invention can be prepared by a known method. The composition of the invention can be prepared by a method disclosed in WO05/052058, for example.

From the conductive polymer composition of the invention, a formed body, a conductive multi-layered body (surface-conductive article), a conductive article, a conductive film or the like can be obtained.

For example, by drying the composition of the invention and removing the solvent, a formed body can be obtained. The shape of the formed body is not limited; it may be a plate-like shape, a rod-like shape, etc. For example, by applying the composition of the invention to a substrate having a desired shape such as a substrate of glass, a resin film or sheet, or unwoven fabric, and by removing the solvent, a conductive multi-layered body having a conductive film can be produced. By processing the conductive multi-layered body into a desired shape by a known method such as vacuum molding and pressure forming, a conductive article can be produced. In respect of forming, the substrate is preferably a resin film, a sheet or an unwoven fabric.

The thickness of the conductive film is normally 1 mm or less, preferably 10 nm or more and 50 μm or less. In a film having a thickness of this range, cracks hardly occur during film formation, and the film has uniform electric properties.

As for the method for applying the composition to the substrate, a known method can be used. Specifically, a cast method, a spray coating method, a dip coating method, a doctor blading method, a bar coating method, a spin coating method, an electro-spinning method, a screen printing method, a gravure printing method or the like can be used.

When drying the coating film mentioned above, according to the type of the solvent, a coating film may be heated. For example, a coating film is heated at a temperature of 250° C. or less, preferably 50° C. or more and 200° C. or less in the stream of air, and further, according to need, the coating film is heated under reduced pressure. No specific restrictions are imposed on the heating temperature and the heating time, and they may be appropriately selected according to the materials used.

The composition of the invention can be formed into a self-supporting formed body having no substrate.

In order to make a self-supporting formed body from the composition of the invention, it is preferred that the composition comprise other resins mentioned above. By doing this, a formed body having a desired mechanical strength can be obtained.

EXAMPLES

Production Example 1

Production of Polyaniline Composite

A solution obtained by dissolving 37.8 g of Aerosol OT (sodium di-2-ethylhexylsulfosuccinate and 1.47 g of Sorbon T-20 that is a non-ionic emulsifier having a polyoxyethylene sorbitan aliphatic acid ester structure (manufactured by Toho Chemical Industry Co., Ltd.) in 600 mL of toluene was put in a 6 L-separable flask in the flow of nitrogen. Further, 22.2 g of aniline was added to this solution. Thereafter, 1800 mL of 1M phosphoric acid was added to the solution. The temperature of the solution having two liquid phases, i.e. toluene and water, was lowered to 5° C.

When the internal temperature of the solution reached 5° C., the solution was stirred at 390 rpm. A solution prepared by dissolving 65.7 g of ammonium persulfate in 600 mL of 1M phosphoric acid was added dropwise for 2 hours by using a dropping funnel. For 18 hours after the start of the dropwise addition, the reaction was conducted while keeping the internal temperature of the solution at 5° C. Thereafter, the reaction temperature was raised to 40° C., and the reaction was continued for 1 hour. Then, the solution was allowed to stand to separate the toluene phase. 1500 ml of toluene was added to the resulting toluene phase, and the resultant was washed once with 500 mL of 1M phosphoric acid and three times with 500 mL of ion exchange water, whereby the toluene phase was separated by allowing the solution to stand. The toluene phase was concentrated to adjust the concentration, whereby 900 g of a polyaniline composite solution was obtained. The concentration of the polyaniline composite in the polyaniline composite toluene solution was 5.7 wt %.

The polyaniline/AOT composite toluene solution was dried under reduced pressure in a hot water bath of 60° C., dried to hardness, whereby 51.3 g of polyaniline composite was obtained.

Example 1

3.5 g of 3-methoxy-1-butanol as the solvent (manufactured by Wako Pure Chemical Industries, Ltd.), 3.5 g of ethylene glycol mono-tert-butyl ether (manufactured by Tokyo Chemical Industry Co., Ltd.) and 3 g of p-tert-amylphenol (manufactured by Wako Pure Chemical Industries, Ltd.) as a phenolic compound were mixed and stirred until the mixture became homogeneous. To 9.9 g of the resulting mixed solvent, 0.1 g of the polyaniline/AOT composite obtained in Production Example 1 was added, and stirred and mixed. After mixing by stirring, insoluble matters were removed by means of 5 C filter paper, whereby a polyaniline/AOT composite (conductive polymer composition) solution was prepared.

To this solution, 0.0165 g of 2-naphthalenesulfonic acid hydrate (manufactured by Tokyo Chemical Industry Co., Ltd.) was added, and the resultant was stirred at 30° C. for 30 minutes. Thereafter, the solution was put in a stainless-made container, and stored in a nitrogen-replaced glove box.

Immediately after and 4 hours after the start of the storage, the viscosity of the composition was measured. The viscosity of the solution was measured at room temperature by means of a tuning fork type viscometer (SV-1H, manufactured by A & D Company, Ltd.).

Further, immediately after, 4 hours after and 8 hours after the start of the storage, the weight of the composition was measured to obtain a weight decrease ratio.

The results of the measurement are shown in Table 1.

TABLE 1

| | Solvent used | | | Composition ratio (weight ratio) | Viscosity (mPa · s) | | Decrease in weight (%) | | |
|---|---|---|---|---|---|---|---|---|---|
| | Solvent 1 | Solvent 2 | Phenolic compound | Solvent 1:Solvent 2: Phenolic compound | 0 h | 4 h | 0 h | 4 h | 8 h |
| Example 1 | 3MB | EGtBu | tAP | 3.5:3.5:3 | 11.6 | 13.0 | 0 | −0.5 | −1.6 |
| Example 2 | 3MB | EGtBu | tAP | 4:4:2 | 9.2 | 9.5 | 0 | −0.3 | −1.6 |
| Example 3 | 3MB | EGtBu | tAP | 2:5:3 | 12.2 | 13.1 | 0 | −0.5 | −1.7 |
| Example 4 | 3MB | EGtBu | tAP | 3:5:2 | 8.6 | 9.4 | 0 | −0.7 | −1.9 |
| Example 5 | 3MB | EGtBu | tAP | 3:6:1 | 6.3 | 6.5 | 0 | −1.0 | −1.9 |
| Example 6 | 3MB | EGtBu | tAP | 2:7:1 | 6.4 | 6.9 | 0 | −0.8 | −1.7 |
| Example 7 | MMB | EGtBu | tAP | 2.5:5:2.5 | 12.0 | 13.2 | 0 | — | −2.3 |
| Example 8 | MMB | EGtBu | tAP | 3:6:1 | 7.8 | 7.9 | 0 | −0.8 | −1.7 |
| Example 9 | 3MB | MMB | tAP | 3.5:3.5:3 | 14.8 | 16.2 | 0 | −0.7 | −1.8 |
| Example 10 | 3MB | MMB | tAP | 4:4:2 | 10.3 | 11.2 | 0 | −1.2 | −3.1 |
| Comp. Ex. 1 | 3MB | IPA | tAP | 3:3:4 | 9.8 | 17 | 0 | −6.7 | −10.6 |
| Comp. Ex. 2 | 3MB | ECH | tAP | 3.5:3.5:3 | 4.5 | 4.9 | 0 | −4.6 | −9.0 |
| Comp. Ex. 3 | 3MB | ECH | tAP | 4:4:2 | 3.5 | 4.1 | 0 | −4.8 | −9.5 |
| Comp. Ex. 4 | 3MB | ECH | tAP | 5:2:3 | 6.7 | 7.9 | 0 | −2.6 | −4.8 |
| Comp. Ex. 5 | 3MB | ECH | tAP | 6:2:2 | 5.5 | 5.7 | 0 | −2.7 | −5.0 |
| Comp. Ex. 6 | 3MB | — | tAP | 8:0:2 | — | — | — | — | — |
| Comp. Ex. 7 | 3MB | 1M2P | tAP | 3:3:4 | — | — | — | — | — |
| Comp. Ex. 8 | 3MB | 1M2P | tAP | 4:4:2 | — | — | — | — | — |

In Table 1, the abbreviations of the solvent and the phenolic compound indicate the following:
3 MB: 3-Methoxy-1-butanol
EGtBu: Ethylene glycol mono-tert-butyl ether
MMB: 3-Methoxy-3-methyl butanol
IPA: Isopropyl alcohol
ECH: Ethylcyclohexane
tAP: p-Tert-amylphenol
1M2P: 1-Methoxy-2-propanol Example 2

A polyaniline/AOT composite solution was prepared and evaluated in the same manner as in Example 1, except that the mixed solvent was prepared by using 4 g of 3-methoxy-1-butanol (manufactured by Wako Pure Chemical Industries, Ltd.), 2 g of p-tert-amylphenol (manufactured by Wako Pure Chemical Industries, Ltd.) and 4 g of ethylene glycol mono-tert-butyl ether (manufactured by Tokyo Chemical Industry, Co., Ltd.). The results are shown in Table 1.

Example 3

A polyaniline/AOT composite solution was prepared and evaluated in the same manner as in Example 1, except that the mixed solvent was prepared by using 2 g of 3-methoxy-1-butanol (manufactured by Wako Pure Chemical Industries, Ltd.), 3 g of p-tert-amylphenol (manufactured by Wako Pure Chemical Industries, Ltd.) and 5 g of ethylene glycol mono-tert-butyl ether (manufactured by Tokyo Chemical Industry, Co., Ltd.). The results are shown in Table 1.

Example 4

A polyaniline/AOT composite solution was prepared and evaluated in the same manner as in Example 1, except that the mixed solvent was prepared by using 3 g of 3-methoxy-1-butanol (manufactured by Wako Pure Chemical Industries, Ltd.), 2 g of p-tert-amylphenol (manufactured by Wako Pure Chemical Industries, Ltd.) and 5 g of ethylene glycol mono-tert-butyl ether (manufactured by Tokyo Chemical Industry, Co., Ltd.). The results are shown in Table 1.

Example 5

A polyaniline/AOT composite solution was prepared and evaluated in the same manner as in Example 1, except that the mixed solvent was prepared by using 3 g of 3-methoxy-1-butanol (manufactured by Wako Pure Chemical Industries, Ltd.), 1 g of p-tert-amylphenol (manufactured by Wako Pure Chemical Industries, Ltd.) and 6 g of ethylene glycol mono-tert-butyl ether (manufactured by Tokyo Chemical Industry, Co., Ltd.). The results are shown in Table 1.

Example 6

A polyaniline/AOT composite solution was prepared and evaluated in the same manner as in Example 1, except that the mixed solvent was prepared by using 2 g of 3-methoxy-1-butanol (manufactured by Wako Pure Chemical Industries, Ltd.), 1 g of p-tert-amylphenol and 7 g of ethylene glycol mono-tert-butyl ether (manufactured by Tokyo Chemical Industry, Co., Ltd.). The results are shown in Table 1.

Example 7

A polyaniline/AOT composite solution was prepared and evaluated in the same manner as in Example 1, except that the mixed solvent was prepared by using 2.5 g of 3-methoxy-3-butanol (manufactured by Wako Pure Chemical Industries, Ltd.), 2.5 g of p-tert-amylphenol (manufactured by Wako Pure Chemical Industries, Ltd.) and 5 g of ethylene glycol mono-tert-butyl ether (manufactured by Tokyo Chemical Industry, Co., Ltd.). The results are shown in Table 1.

Example 8

A polyaniline/AOT composite solution was prepared and evaluated in the same manner as in Example 1, except that the mixed solvent was prepared by using 3 g of 3-methoxy-3-methyl butanol (manufactured by Wako Pure Chemical Industries, Ltd.), 1 g of p-tert-amylphenol (manufactured by Wako Pure Chemical Industries, Ltd.) and 6 g of ethylene glycol mono-tert-butyl ether (manufactured by Tokyo Chemical Industry, Co., Ltd.). The results are shown in Table 1.

Example 9

A polyaniline/AOT composite solution was prepared and evaluated in the same manner as in Example 1, except that the mixed solvent was prepared by using 3.5 g of 3-methoxy-3-methyl butanol (manufactured by Wako Pure Chemical Industries, Ltd.), 3 g of p-tert-amylphenol (manufactured by Wako Pure Chemical Industries, Ltd.) and 3.5 g of 3-methoxy-1-butanol (manufactured by Tokyo Chemical Industry, Co., Ltd.). The results are shown in Table 1.

Example 10

A polyaniline/AOT composite solution was prepared and evaluated in the same manner as in Example 1, except that the mixed solvent was prepared by using 4 g of 3-methoxy-3-methyl butanol (manufactured by Wako Pure Chemical Industries, Ltd.), 2 g of p-tert-amylphenol (manufactured by Wako Pure Chemical Industries, Ltd.) and 4 g of 3-methoxy-1-butanol (manufactured by Tokyo Chemical Industry, Co., Ltd.). The results are shown in Table 1.

Comparative Example 1

A polyaniline/AOT composite solution was prepared and evaluated in the same manner as in Example 1, except that the mixed solvent was prepared by using 3 g of 3-methoxy-1-butanol (manufactured by Wako Pure Chemical Industries, Ltd.), 4 g of p-tert-amylphenol (manufactured by Wako Pure Chemical Industries, Ltd.) and 3 g of isopropyl alcohol (manufactured by Wako Pure Chemical Industries, Ltd.). The results are shown in Table 1.

Comparative Example 2

A polyaniline/AOT composite solution was prepared and evaluated in the same manner as in Example 1, except that the mixed solvent was prepared by using 3.5 g of 3-methoxy-1-butanol (manufactured by Wako Pure Chemical Industries, Ltd.), 3 g of p-tert-amylphenol (manufactured by Wako Pure Chemical Industries, Ltd.) and 3.5 g of ethylcyclohexane (manufactured by Wako Pure Chemical Industries). The results are shown in Table 1.

Comparative Example 3

A polyaniline/AOT composite solution was prepared and evaluated in the same manner as in Example 1, except that the mixed solvent was prepared by using 4 g of 3-methoxy-1-butanol (manufactured by Wako Pure Chemical Industries, Ltd.), 2 g of p-tert-amylphenol (manufactured by Wako Pure Chemical Industries, Ltd.) and 4 g of ethylcyclohexane (manufactured by Wako Pure Chemical Industries, Ltd.). The results are shown in Table 1.

Comparative Example 4

A polyaniline/AOT composite solution was prepared and evaluated in the same manner as in Example 1, except that the mixed solvent was prepared by using 5 g of 3-methoxy-1-butanol (manufactured by Wako Pure Chemical Industries, Ltd.), 3 g of p-tert-amylphenol (manufactured by Wako Pure Chemical Industries, Ltd.) and 2 g of ethylcyclohexane (manufactured by Wako Pure Chemical Industries, Ltd.). The results are shown in Table 1.

Comparative Example 5

A polyaniline/AOT composite solution was prepared and evaluated in the same manner as in Example 1, except that the mixed solvent was prepared by using 6 g of 3-methoxy-1-butanol (manufactured by Wako Pure Chemical Industries, Ltd.), 2 g of p-tert-amylphenol (manufactured by Wako Pure Chemical Industries, Ltd.) and 2 g of ethylcyclohexane (manufactured by Wako Pure Chemical Industries, Ltd.). The results are shown in Table 1.

Comparative Example 6

A polyaniline/AOT composite solution was prepared in the same manner as in Example 1, except that the mixed solvent was prepared by using 8 g of 3-methoxy-1-butanol (manufactured by Wako Pure Chemical Industries, Ltd.) and 2 g of p-tert-amylphenol (manufactured by Wako Pure Chemical Industries, Ltd.). However, after stirring, precipitation occurred at the bottom. That is, solubility was not sufficient and hence a homogenous polyaniline/AOT composite solution could not be prepared.

Comparative Example 7

A polyaniline/AOT composite solution was prepared in the same manner as in Example 1, except that the mixed solvent was prepared by using 3 g of 3-methoxy-1-butanol (manufactured by Wako Pure Chemical Industries, Ltd.), 4 g of p-tert-amylphenol (manufactured by Wako Pure Chemical Industries, Ltd.) and 3 g of 1-methoxy-2-propanol. However, after stirring, precipitation occurred at the bottom. That is, solubility was not sufficient and hence a homogenous polyaniline/AOT composite solution could not be prepared.

Comparative Example 8

A polyaniline/AOT composite solution was prepared in the same manner as in Example 1, except that the mixed solvent was prepared by using 4 g of 3-methoxy-1-butanol (manufactured by Wako Pure Chemical Industries, Ltd.), 2 g of p-tert-amylphenol (manufactured by Wako Pure Chemical Industries, Ltd.) and 4 g of 1-methoxy-2-propanol. However, after stirring, precipitation occurred at the bottom. That is, solubility was not sufficient and hence, a homogenous polyaniline/AOT composite solution could not be prepared.

INDUSTRIAL APPLICABILITY

The conductive polymer composition of the invention can be used in the fields of power electronics and optoelectronics as static and anti-static materials, materials for a transparent electrode and a conductive film, materials for an electroluminescence device, a circuit material, an electromagnetic shielding material, an electromagnetic wave absorbing material, a noise suppressing material, a dielectric and an electrolyte of a capacitor, a polar material of a solar cell and a secondary battery, a material for a separator of a fuel cell, or as an under coating, a rust preventive or the like.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The Japanese application specification claiming priority under the Paris Convention are incorporated herein by reference in its entirety.

The invention claimed is:

1. A conductive polymer composition comprising:
   a conductive polymer;
   a compound having a phenolic hydroxyl group; and
   at least two solvents selected from the group consisting of 3-methoxy-1-butanol, 3-Methoxy-3-methyl butanol and ethylene glycol mono-tert-butyl ether
   wherein the conductive polymer is a composite of unsubstituted polyaniline and a sulfosuccinic derivative represented by the following formula (III):

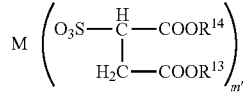

(III)

wherein M is a hydrogen atom, an organic free radical group or an inorganic free radical group; m' is the valence of M; and $R^{13}$ and $R^{14}$ are a 2-ethylhexyl group.

2. The conductive polymer composition according to claim 1, wherein the compound having a phenolic hydroxyl group is represented by the following formula (C):

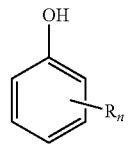

(C)

wherein n is an integer of 1 to 5; and R is independently an alkyl group including 1 to 20 carbon atoms, an alkenyl group including 1 to 20 carbon atoms, an alkylthio group including 1 to 20 carbon atoms, a cycloalkyl group including 3 to 10 carbon atoms, an aryl group including 6 to 20 carbon atoms, an alkylaryl group including 7 to 20 carbon atoms or an arylalkyl group including 7 to 20 carbon atoms.

3. The conductive polymer composition according to claim 2, wherein n is 1 and R is an alkyl group including 1 to 8 carbon atom(s).

4. The conductive polymer composition according to claim 1, wherein the compound having a phenolic hydroxyl group is p-tert-amylphenol.

5. The conductive polymer composition according to claim 1, wherein the two solvents are 3-methoxy-1-butanol and ethylene glycol mono-tert-butyl ether.

6. The conductive polymer composition according to claim 1, wherein a content of the compound having a phenolic hydroxyl group is from 1 mass % to 40 mass %.

7. The conductive polymer composition according to claim 1, wherein 90 wt % or more of the conductive polymer composition is the conductive polymer, the solvents, the compound having a phenolic hydroxyl group and at least one additive selected from heat-resistant stabilizers, resins other than the conductive polymer, inorganic materials, hardening agents, plasticizers and organic conductive materials.

8. The conductive polymer composition according to claim 1, wherein 90 wt % or more of the conductive polymer composition is the conductive polymer, the solvents and the compound having a phenolic hydroxyl group.

9. The conductive polymer composition according to claim 1, wherein a mixing ratio of the two solvents is 20:80 to 80:20 in terms of mass ratio.

10. The conductive polymer composition according to claim 1, wherein an amount ratio of the conductive polymer is 0.001 wt % to 30 wt % relative to 100 wt % of the composition.

* * * * *